INVENTOR.
LOURDES V. McCARTY
BY John W. Michael
ATTORNEY

April 19, 1960
L. V. McCARTY
2,933,256
ANTICIPATED MECHANICAL THERMOSTAT
Filed March 11, 1957
3 Sheets-Sheet 3
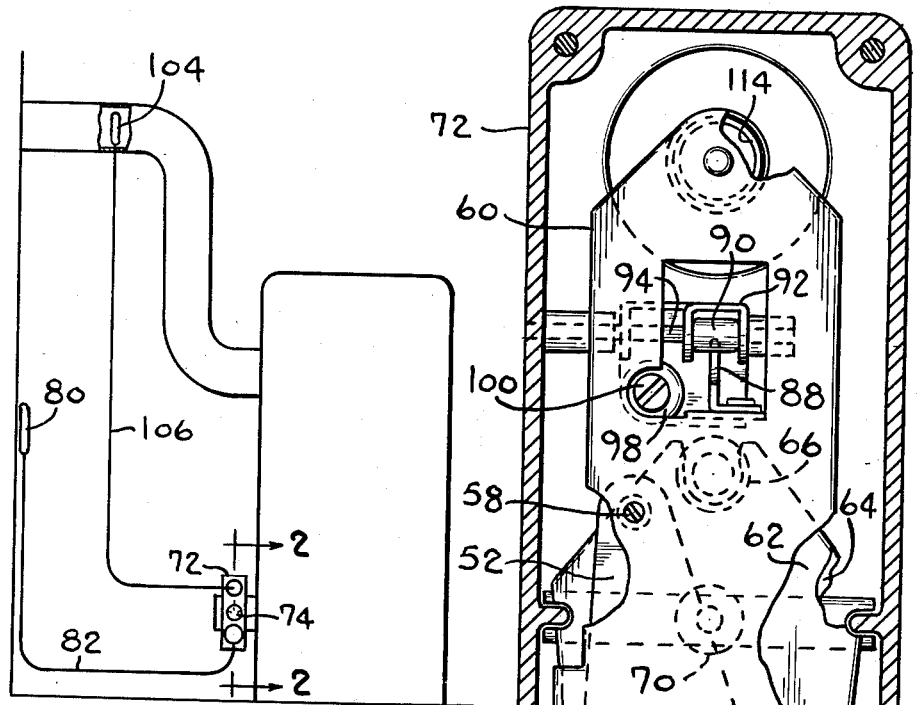
FIG. 5
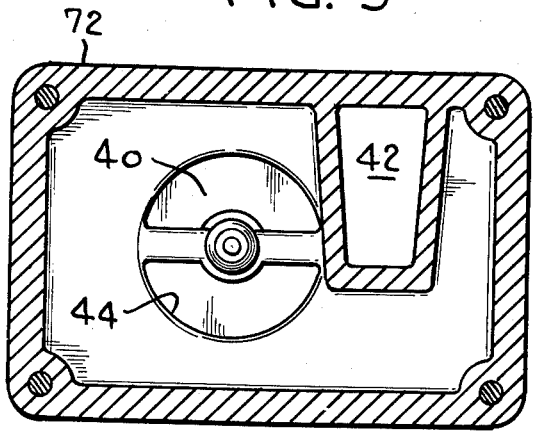
FIG. 4
FIG. 3
INVENTOR.
LOURDES V. McCARTY
BY
John W. Michael
ATTORNEY United States Patent Office 2,933,256
Patented Apr. 19, 1960

2,933,256
ANTICIPATED MECHANICAL THERMOSTAT

Lourdes V. McCarty, Milwaukee, Wis., assignor to Controls Company of America, Schiller Park, Ill., a corporation of Delaware Application March 11, 1957, Serial No. 645,084

2 Claims. (Cl. 236—9)

This invention relates to an anticipated mechanical thermostat. A mechanical thermostat derives the force for moving the fuel control valve from the thermal energy of the sensing means which is usually positioned to sense a room temperature. These thermostats require a temperature change at the sensing means large enough to supply the energy required to move the valve. This temperature change is called the differential of the thermostat and in mechanical thermostats the differential is inherently high as compared to electrical thermostats. With electric thermostats it has long been common to provide anticipators to decrease or eliminate the differential. Comparatively speaking, therefore, the mechanical thermostat has always been considered a poor second in ability to maintain the selected temperature. To my knowledge there has not been any successful effort to provide mechanical thermostats with anticipation.

The primary object of this invention is to provide an anticipated mechanical thermostat. The basic invention here is applicable to the so-called snap and modulating-snap thermostats and may be used with solid or vapor charged sensors.

Other objects and advantages will be pointed out in, or be apparent from, the specification and claims, as will obvious modifications of the single embodiment shown in the drawings in which:

Figure 3 is a section through the control of Figure 2 on line 3—3;

Figure 4 is a section on line 4—4 in Figure 2; and

Figure 5 is a schematic arrangement showing installation of the control of Figure 2 but also demonstrates the principles applicable in use of the Figure 1 thermostat.

Fig. 6 is a diagrammatic view indicating the position of the parts when the fuel valve is open.

Figure 1:
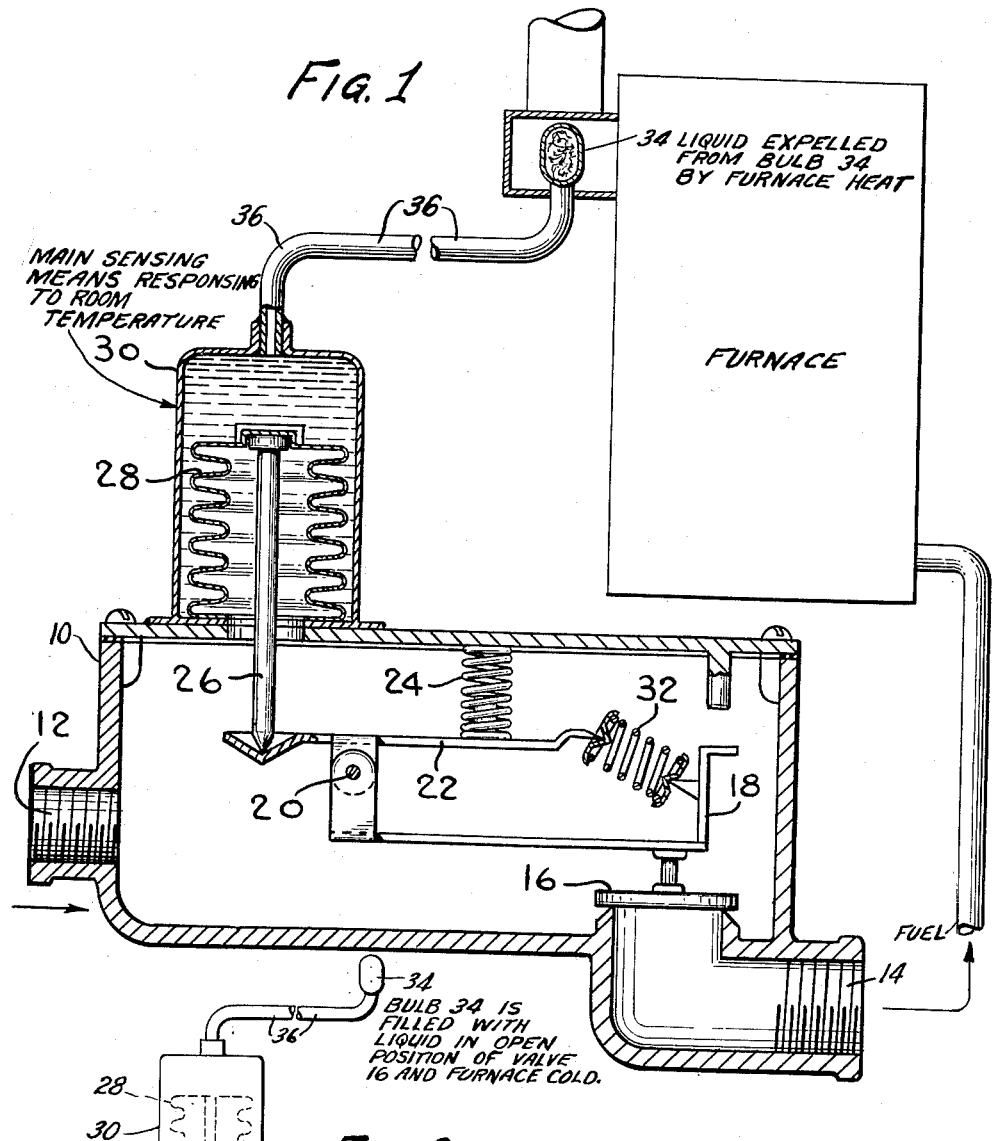
Figure 1 is a schematic view of a snap acting mechanical thermostat having the anticipator.
Figure 2:
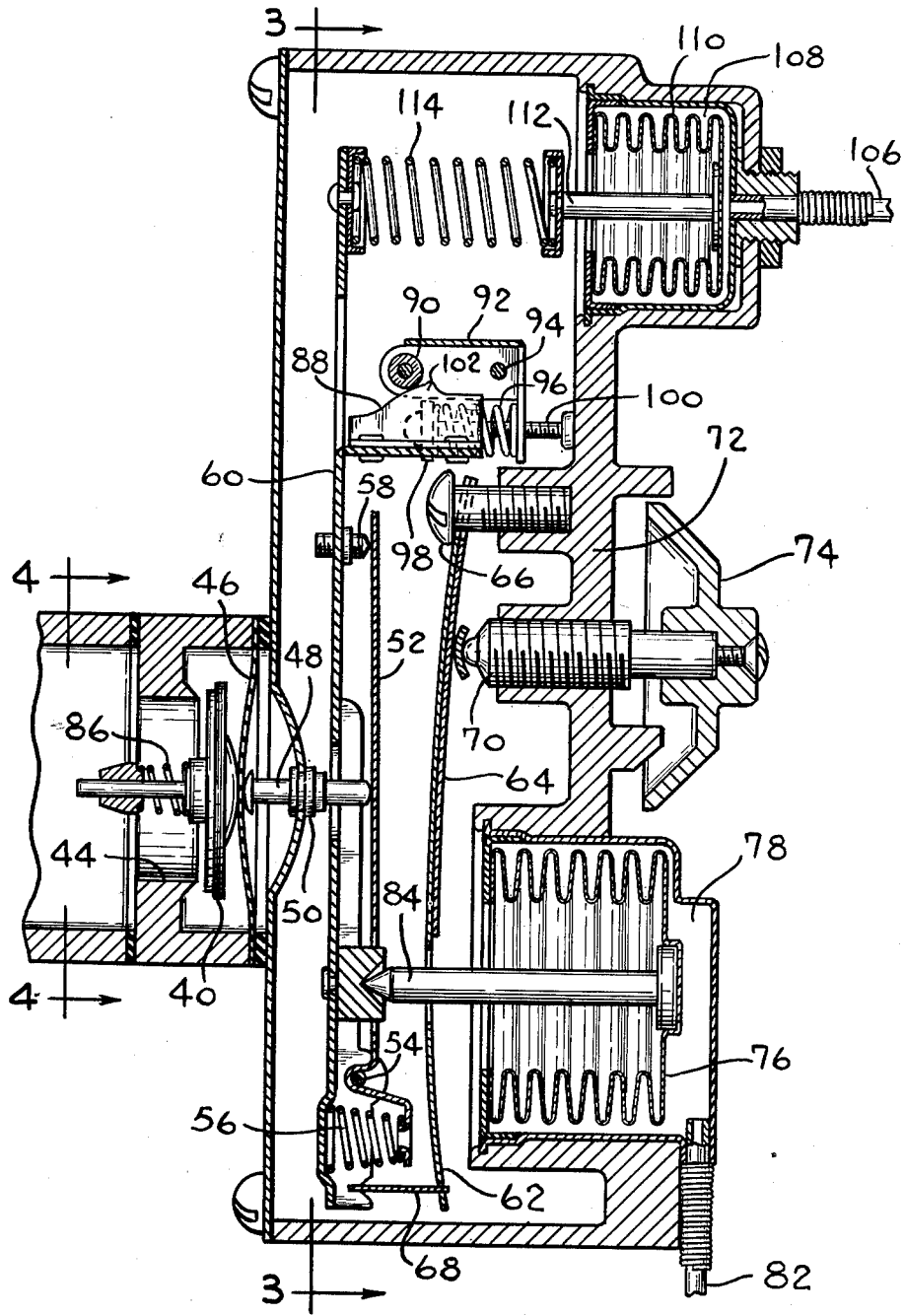
Figure 2 is a section through a modulating mechanical thermostat having the anticipator.

Referring first to the snap acting version shown in Figure 1 (schematic showing) wherein the thermal energy of a system fully charged with a vaporizable liquid is employed, a basically elementary snap acting valve mechanism is shown actuated by a feeler bulb sensing ambient temperature and provided with an anticipator bulb which may be placed in the furnace stack. The valve housing 10 has a gas inlet 12 and an outlet 14 controlled by valve 16, carried by snap lever 18. The lever is pivoted on pin 20 as is the actuating lever 22. Spring 24 biases lever 22 to follow the motion of push pin 26 actuated by bellows 28. The bellows is sealed with respect to rigid bulb housing 30 to form a chamber sensing ambient temperature. As shown in the drawings the pressure in bulb 30 is high enough to have seated the valve. As the pressure decreases lever 22 will rock about pin 20 in a clockwise direction until toggle spring 32 compressed between lever 22 and lever 18 passes over center whereupon the forces acting on lever 18 reverse and valve 16 snaps open. As the temperature about bulb 30 increases the pressure will increase to rock the lever 22 back to snap valve 16 closed.

With the structure thus far described the thermostatic control is conventional and with the system fully charged with a liquid which remains liquid at all normal ambient temperatures, can be made with about a 4° differential. That is to say, if the valve snaps open at 70° (at bulb 30) it will require 4° temperature increase before the thermal energy in bulb 30 is sufficient to snap the valve closed. Therefore, the room temperature fluctuates between 70° and 74°. This is far from the close control attainable with an anticipated electric thermostat. To obtain an anticipation effect I provide the remote bulb 34 connected to bulb 30 by capillary tubing 36 and position the bulb in the stack of the furnace where at times of combustion within the furnace, temperatures exist which are sufficiently high to vaporize the liquid charge in the bulb 34. Bulb 30 is provided with a solid charge and if anticipation desired is 5° the volume is selected so that at or above a predetermined temperature (say 250°) the effect at bellows 28 is as if there was a 5° rise at bulb 30. For example, if .020 inch is required to snap the valve and the bulb 30 has a 4° differential and the bellows diameter is 9/16 inches and an effective area of .17 square inch, then .17×.02=.0034 cubic inches is the volume change required to operate the valve. Therefore, the volume of the anticipator bulb 34 is made .0034×5/4=.00394 cubic inch and the effect upon the whole assembly at such times as the stack temperature rises to a point to cause vaporization of the liquid charge in the bulb 34 will be substantially the same as a 5° F. rise in temperature at the ambient temperature sensing bulb 30, due to the action of the generated vapors within the bulb 34 expelling the liquid therefrom. This effect will be quite abrupt at the selected temperature.

With this arrangement and ambient bulb 30 set to respond at 70° to open the gas valve the anticipator bulb 34 will heat up to its temperature in about 5 minutes whereupon it will actuate bellows 28 to close the valve which will remain closed until the anticipator cools below its temperature whereupon the valve can open depending upon the temperature of bulb 30. If the heat has elevated the temperature above 70° the valve remains closed until the room temperature drops to 70°. If the room temperature is between 69° and 70° the valve will operate on and off at a rate determined by the rate of heat absorption and dissipation of the anticipator 34. If the room temperature drops below 69° then the anticipator can not act to close the valve [(69−°)+5° =74−° which is not enough] and the valve will remain open until the temperature rises to 69°. It will be seen, therefore, that below 69° the valve stays open, above 70° it stays closed, and between 69° and 70° the valve will cycle.

If the anticipation was reduced from 5° to 4° the control could maintain a practically constant room temperature rather than the 1° spread above noted. It is, however, very difficult to so set the anticipator and it is preferable to have the anticipation a little greater than the differential as opposed to being less. It can be said to be preferably equal to or greater than the differential.

Figures 2–5 show this basic idea applied to a modulating snap control and employing a vapor charged anticipator in lieu of the liquid charged form of Figure 1. The principle of using the heat from the furnace to lower the turn-off point of the control a definite amount is common to both forms.

In a modulating control the differential between high fire and off is greater than in the snap type control. In the illustrated control the valve 40 is modulated from "high" to "low" and then snaps "off." Valve 40 controls flow from inlet 42 to outlet 44 and is actuated through diaphragm seal 46 by pin 48 pushed at 50 and moved by lever 52. Lever 52 is pivoted on pin 54 and is urged by compressed spring 56 against stop 58 on lever 60 to yieldably follow lever 60. Lever 60 is biased in the valve closing direction by leaf springs 62, 64 fulcrumed on screw head 66 and acting on the end of lever 60 through link 68 with a bias determined by the setting of adjusting screw 70 threaded in housing 72 and having knob 74 fixed thereto for manual operation. Motion is imparted to the lever in opposition to the leaf spring bias by bellows 76 as the pressure in chamber 78 in accordance with temperature at the control point where the sensing bulb 80 is located. The bulb is connected to the chamber by capillary tubing 82 and as the pressure in chamber 78 decreases, for example, springs 62, 64 acting on lever 60 cause the lever to follow the motion of bellows push pin 84, thus permitting the valve spring 86 to open the valve. As the lever moves, the cam 88 on the end of the lever moves under roller 90 carried on crank 92 pivoted on pin 94 and biased against the cam by spring 96 compressed between the crank and an abutment 98 on the end of adjusting screw 100 threaded into the housing. This cam is formed with a hump 102 having a steep rise to the right and a gradual rise to the left. When the roller is to the right of the hump the valve is closed and considerable force is required to move the cam under the roller past the hump. Therefore, when the force is large enough the valve will snap open. As the temperature at the bulb 80 rises the valve moves to low fire at which time the hump engages the roller and again requires a considerable force build-up before the cam can move further in the closing direction. Consequently, the valve snaps from "low fire" to "off."

The arrangement thus far described is a mechanical modulating thermostat. Such a thermostat generally has about an 8° differential. Thus if the fire goes to high at 70° it will modulate to low at 75° and snap off at 78°. This is obviously more differential than generally desirable. By providing an anticipator the control action can be improved where the heat load is less than 40–50% of the heater capacity which covers a major portion of the heating season.

In this anticipator I employ a vapor charged bulb 104 in the stack and connected by capillary tube 106 to chamber 108 to actuate bellows 110. Bellows motion is transmitted by pin 112 and overload spring 114 to lever 60. If the bulb size and charge is selected to give 8° anticipation the operation will be as follows.

If the control opens the valve (to high) at 70° the stack temperature will act on bulb 104 in about 5 minutes to have the effect of an 8° temperature rise to close the valve. While the stack temperature rises the valve will be modulated towards low since the anticipator bulb has a vapor charge which has a continuous effect. However, as seen from the above, the control virtually has a snap action. On closing the valve and cooling the anticipator bulb the control will remain off if the heat supplied during the "on" cycle raised the room temperature above 70°. When the room temperature falls to 70° the control will again open the valve. This type of snap action will actually cover the majority of the heating season and thus the operation is improved for this part of the season.

When the heat load is too great, however, the control more or less reverts to its wide differential characteritsic. Thus, if after the anticipator bulb has acted the room temperature is below 70° the valve will remain open. If the room temperature is between 67° and 70° the effective temperature is between 75 (67+8) and 78° (70+8) and the valve will be at low fire. If below 67° the modulating action will act to open the valve until at 62° (62+8=70° effective) the valve is at high fire. Therefore, with a high heat load the control ranges below the selected temperature rather than always above as with the unanticipated model. This is a necessary evil in this arrangement and the only answer is to readjust knob 74 to raise the temperature setting when the heat load is great. This is deemed a small objection compared to the improved snap action obtained in the major part of the heating season.

From the above it will be seen that the present anticipator can be either a solid or vapor charge and can be used with either a snap or a modulating mechanical thermostat. In both arrangements the furnace heat is used to lower the turn-off point a definite amount.

In the above description the reference to room temperature is not fully accurate since the sensor for room temperature actually responds to its own temperature which lags room temperature slightly. However, the usage is customary. In the claims "heater" and "furnace" and the like are meant to be generic terms to fuel burning space heaters. It will be appreciated the present device can control liquid fuel as well as gaseous fuel.

Although but two embodiments of the present invention have been illustrated and described, it will be apparent to those skilled in the art that various changes and modifications may be made therein without departing from the spirit of the invention or from the scope of the appended claims.

I claim:

1. A mechanical thermostatic control for regulating fuel flow to a furnace or the like, comprising, a valve movable to open and closed positions to regulate fuel flow, means for moving the valve, said means including, a first heat sensing means adapted to sense the temperature of the heated medium and deriving a force for effecting valve movement from the thermal energy of the sensing means and thus involving a necessary differential in temperature between the temperature at which the valve opens and the temperature at which the valve closes, and a second heat sensing means adapted to sense a furnace temperature and deriving therefrom a force for effecting valve movement in valve closing direction upon sensing a predetermined temperature in excess of the temperature of the heated medium, means operatively connecting said first and second heat sensing means with the valve, the second heat sensing means including a bulb fully charged with a liquid at temperatures below said predetermined temperature and dimensioned so that at or above said predetermined temperature said liquid is expelled from said bulb to impart to the valve a motion that is substantially fixed at said predetermined temperature and at temperatures in excess thereof and which motion is equivalent to or greater than the motion imparted to the valve by the first heat sensing means upon sensing its temperature differential.

2. The combination according to claim 1 in which a single bellows is actuated by both sensing means, the sensing means being interconnected.

References Cited in the file of this patent

UNITED STATES PATENTS

| | | |
|---|---|---|
| 2,006,282 | Smith | June 25, 1935 |
| 2,044,822 | Vaughn | June 23, 1936 |
| 2,164,882 | Miles | July 4, 1939 |
| 2,273,734 | Pearce | Feb. 17, 1942 |
| 2,339,087 | Mantz | Jan. 11, 1944 |
| 2,651,468 | Joesting | Sept. 8, 1953 |